United States Patent
Wehner

(10) Patent No.: US 7,086,765 B2
(45) Date of Patent: Aug. 8, 2006

(54) LED LAMP WITH LIGHT PIPE FOR AUTOMOTIVE VEHICLES

(75) Inventor: Kathryn M. Wehner, Carmel, IN (US)

(73) Assignee: Guide Corporation, Pendleton, IN (US)

( * ) Notice: Subject to any disclaimer, the term of this patent is extended or adjusted under 35 U.S.C. 154(b) by 0 days.

(21) Appl. No.: 10/808,829

(22) Filed: Mar. 25, 2004

(65) Prior Publication Data

US 2005/0213341 A1 Sep. 29, 2005

(51) Int. Cl.
*F21V 29/00* (2006.01)
*F21V 7/04* (2006.01)

(52) U.S. Cl. .................. 362/511; 362/555; 362/294; 362/240

(58) Field of Classification Search .............. 362/240, 362/241, 294, 348, 511, 517, 518, 545, 547, 362/551, 555, 800, 27
See application file for complete search history.

(56) References Cited

U.S. PATENT DOCUMENTS

| | | | |
|---|---|---|---|
| 5,428,509 A * | 6/1995 | Dassanayake | 362/551 |
| 5,806,969 A | 9/1998 | Rosengren | |
| 5,816,681 A | 10/1998 | Tedesco | |
| 6,113,247 A | 9/2000 | Adams et al. | |
| 6,164,799 A | 12/2000 | Hirmer et al. | |
| 6,238,073 B1 * | 5/2001 | Ito et al. | 362/545 |
| 6,398,988 B1 | 6/2002 | Jenkins et al. | |
| 6,406,172 B1 | 6/2002 | Harbers et al. | |
| 6,412,971 B1 | 7/2002 | Wojnarowski et al. | |
| 6,414,801 B1 | 7/2002 | Roller | |
| 6,443,594 B1 | 9/2002 | Marshall et al. | |
| 6,520,669 B1 | 2/2003 | Chen et al. | |
| 6,523,976 B1 | 2/2003 | Turnbull et al. | |
| 6,641,295 B1 * | 11/2003 | Hu | 362/545 |
| 6,682,211 B1 * | 1/2004 | English et al. | 362/547 |
| 6,871,983 B1 * | 3/2005 | Jacob et al. | 362/294 |
| 6,926,435 B1 * | 8/2005 | Li | 362/555 |
| 2004/0120160 A1 * | 6/2004 | Natsume | 362/241 |
| 2004/0141336 A1 * | 7/2004 | West et al. | 362/555 |

* cited by examiner

*Primary Examiner*—Y. My Quach-Lee
(74) *Attorney, Agent, or Firm*—Ice Miller LLP

(57) ABSTRACT

An LED lamp assembly comprises a housing having a multi-faceted reflector positioned therein for reflecting light into a light beam. A LED carrier is positioned in front of the reflector and extends vertically from the top to the bottom of the reflector. A plurality of LEDs are positioned on the LED carrier and arranged and disposed to emit light directly on to the reflector, thereby creating the light beam. A light pipe is also positioned within the housing in front of the reflector and in front of the LED carrier. The light pipe extends vertically along the LED carrier from the top to the bottom of the reflector. Accordingly, the LED carrier and light pipe are positioned in the path of the light beam propagated from the reflector.

15 Claims, 5 Drawing Sheets

LED LAMP WITH LIGHT PIPE FOR AUTOMOTIVE VEHICLES

BACKGROUND

The present invention relates generally to an automotive lamp assembly for an automotive vehicle. In particular, the present invention relates to a headlamp or tail lamp including a plurality of light emitting diodes as the light source.

Light emitting diodes (LEDs) are becoming increasingly important in vehicle headlamp and tail lamp applications. LEDs are smaller than incandescent bulbs and use less energy. In addition, LEDs have a longer life than standard incandescent light bulbs. Accordingly, use of LEDs in automotive headlamps and tail lamps can provide significant energy savings, increased lamp life, smaller lamp size, and flexibility in the design. For these reasons, automobile manufacturers are increasingly interested in unique headlamp and tail lamp designs incorporating LEDs that may also have appeal to automobile customers.

SUMMARY

An LED lamp with light pipe for automotive vehicles comprises a housing having a multi-faceted reflector positioned therein for reflecting light into a light beam. The direction of propagation of the light beam defines locations in front of the reflector. A LED carrier having a front portion and a rear portion is positioned in front of the reflector and extends vertically from the top to the bottom of the reflector. A plurality of LEDs are positioned in LED seats on the rear of the LED carrier. The LEDs positioned on the LED carrier are arranged and disposed to emit light directly on to the reflector, thereby creating the light beam. In particular, each LED is directly opposed to one of the facets of the reflector. In addition to supporting the LEDs, the LED carrier acts as a heat sink for dissipating heat generated by the LEDs. A light pipe is also positioned within the housing in front of the reflector and in front of the LED carrier. The light pipe extends vertically along the LED carrier from the top to the bottom of the reflector. Accordingly, the LED carrier and light pipe are positioned in the path of the light beam propagated from the reflector.

DESCRIPTION

Figure 1:
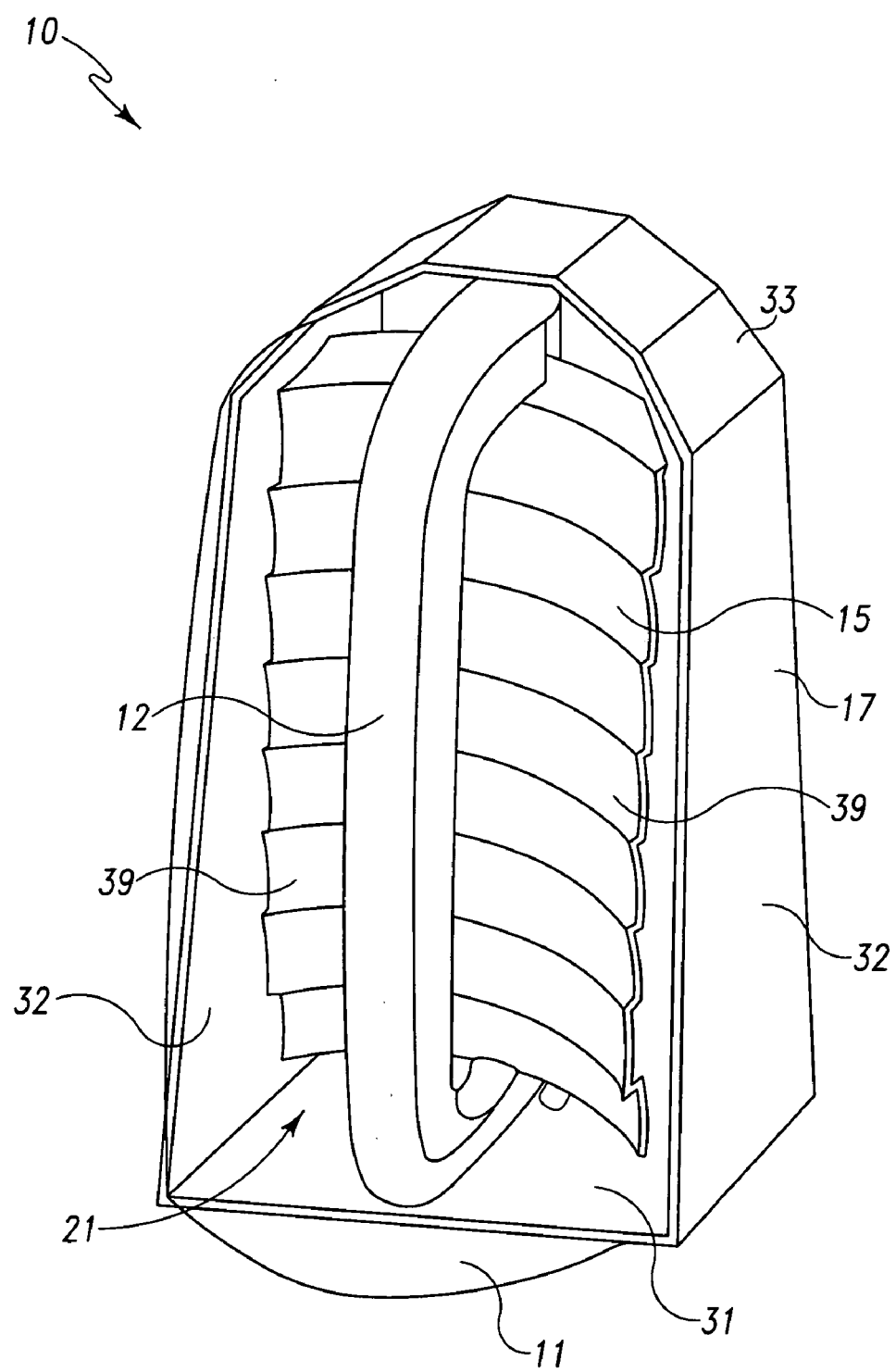
FIG. 1 shows a perspective view of a LED lamp with light pipe for automotive vehicles.
Figure 2:
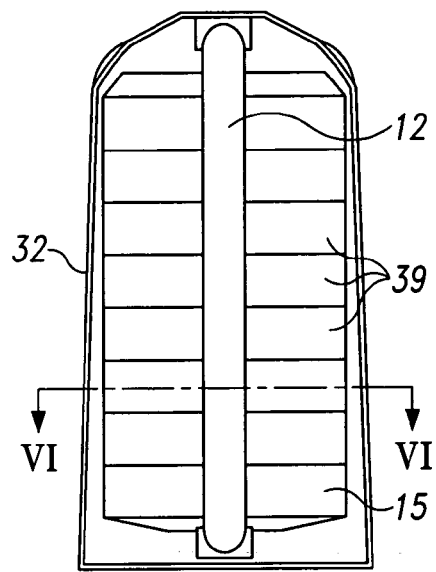
FIG. 2 shows a front view of the LED lamp of FIG. 1.
Figure 3:
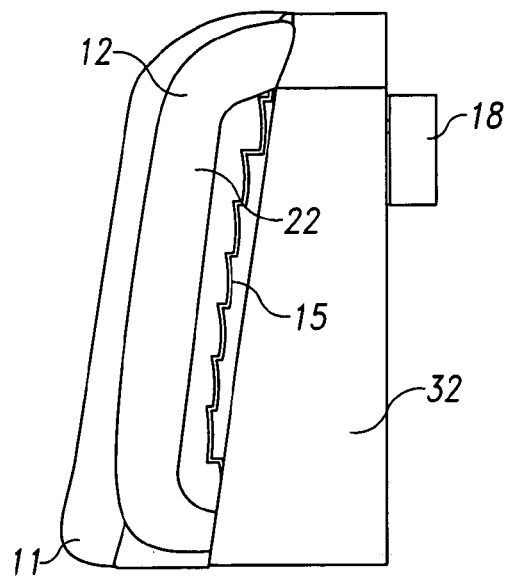
FIG. 3 shows a side view of the LED lamp of FIG. 1.
Figure 4:
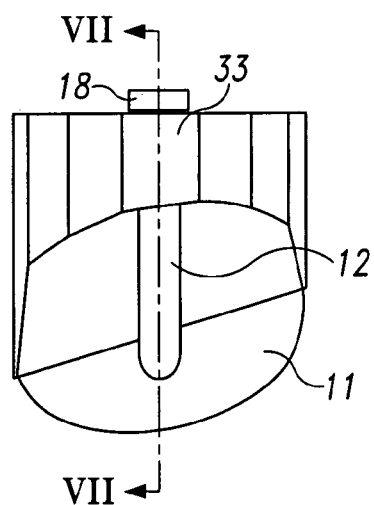
FIG. 4 shows a top view of the LED lamp of FIG. 1.

As shown in FIGS. 1–7, a LED lamp with light pipe for automotive vehicles 10 comprises a lamp housing 17 having a multi-stage reflector 15 positioned therein. A light pipe 12 extends vertically in front of the reflector from the top of the reflector to the bottom of the reflector. A light source in the form of a plurality of LEDs 14 (see FIG. 5) are positioned between the reflector and the light pipe 12. The LEDs face the reflector 15 and emit light on to the surface of the reflector 15. A lens 11 is positioned in front of the light pipe. Light emitted from the LEDs 14 reflects off the surface of the reflector 15 and passes through the lens 11 to form a light beam.

The lamp housing 17 is made of a molded material, such as polypropylene, and defines a lamp cavity 21 where the light pipe 12, reflector 15 and LEDs 14 are contained. The housing includes a flat base, with two sidewalls 32 and a back plate extending upward from the base. The two sidewalls 32 slightly taper toward each other as they approach a top 33 of the housing. The top 33 provides a segmented arch that spans from one sidewall to the other.

Figure 5:
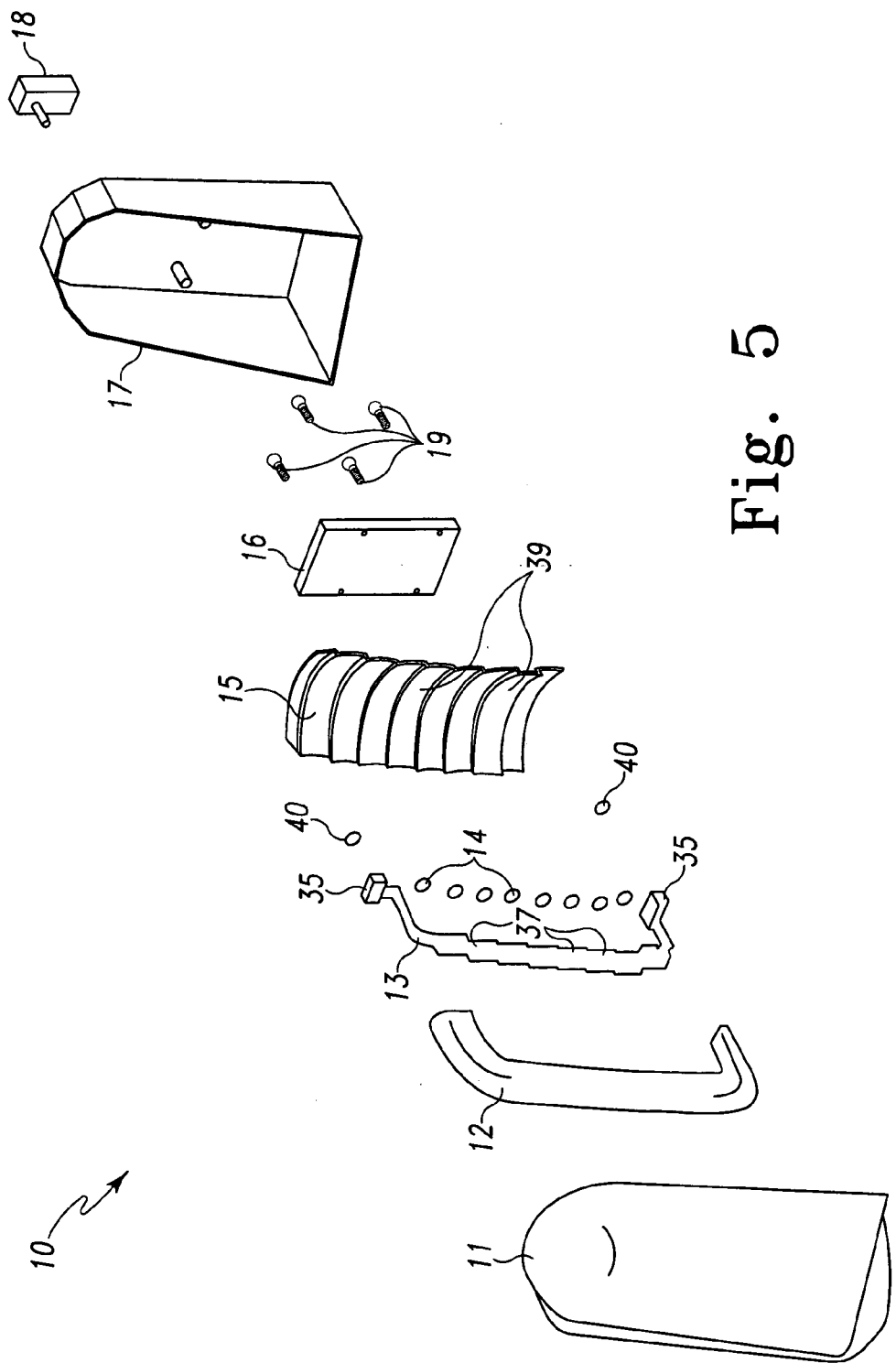
FIG. 5 shows an exploded isometric view of the LED lamp of FIG. 1.
Figure 6:
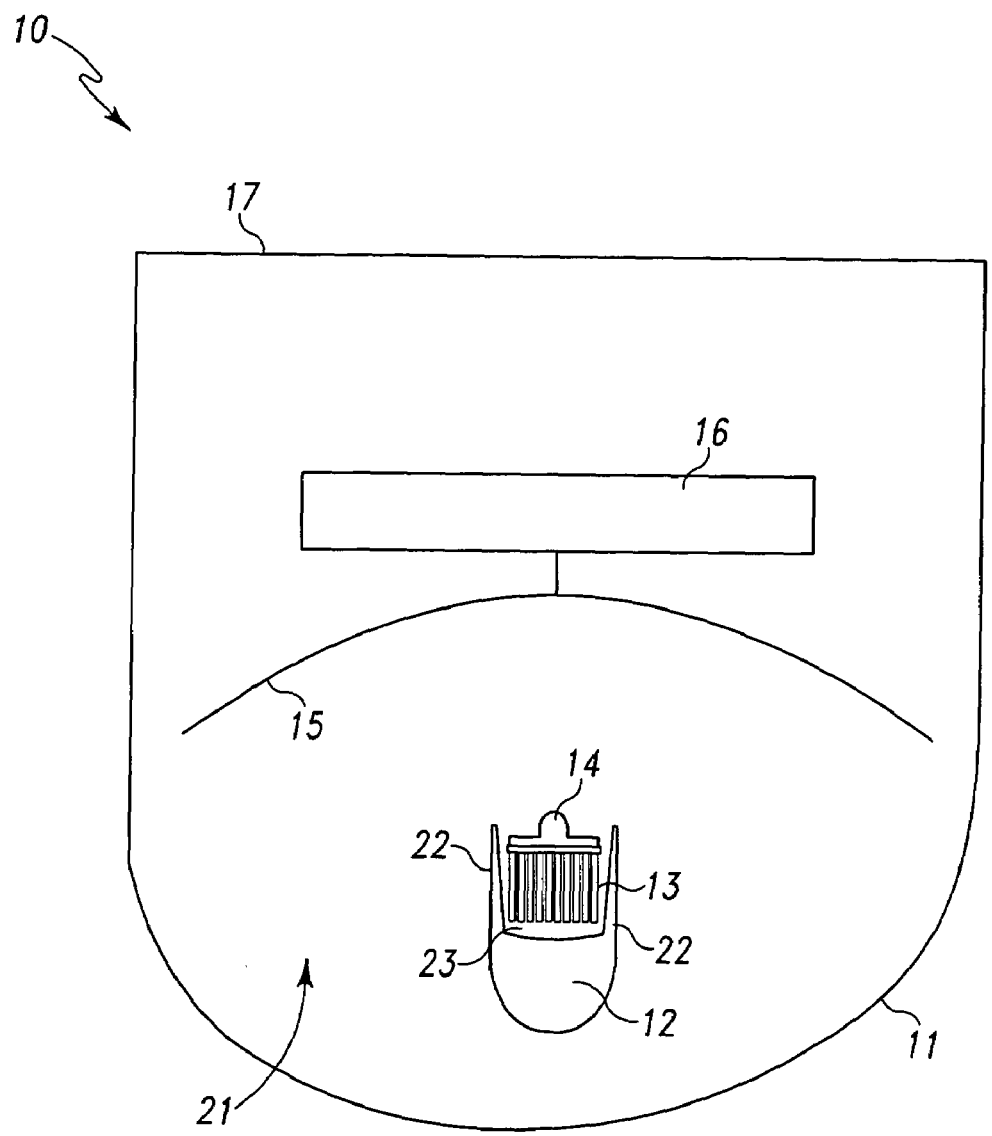
FIG. 6 shows a cross-sectional view of the LED lamp along line VI—VI of FIG. 2.

As shown in FIG. 5, an elongated LED carrier 13 is positioned vertically in the lamp cavity 21 and extends from near the top of the housing to the base of the housing. The LED carrier 13 is made of a material that is a good conductor of thermal energy, such as aluminum or other metal so that it can act as a heat sink for the LEDs. The LED carrier 13 includes two mounting brackets 35 that are attached to the reflector. In between the mounting brackets 35, a plurality of LED seats 37 are positioned in a vertical line along the length of the posterior of the LED carrier. Each LED seat 37 is designed and adapted to receive an LED 14. Electrical connections are also provided in or on the LED carrier 13 and provide electrical communication from one LED seat to the next. The electrical connections may take a number of different forms such as simple wiring that runs along the LED carrier, or integrated connections insulated within the LED carrier.

A light source is provided on the LED carrier 13 in the form of a plurality of LEDs 14 The LEDs 14 are arranged and disposed in the LED seats of the LED carrier 13 such that they shine light toward the reflector 15. The LEDs 14 used in the lamp 10 have a light distribution pattern such that most of the light emitted from the LEDs will strike the reflector. For example, the 5-watt Luxeon® white LED may be used for the lamp 10. In an alternative embodiment, light baffles may be provided around each LED to help prevent light emitted from the LEDs from striking any surfaces other than the desired portion of the reflector.

A LED drive module ("LDM") 16 is positioned behind the reflector inside of the housing. The LDM 16 is electrically connected to the LED carrier 13 such that the LDM can regulate current going to the LEDs 14. The LDM 16 is particularly useful in lamps with multiple or flashing functions, such as stop, tail and turn lamps or lamps that are more sensitive to current fluctuation, such as low beam headlamps. The LDM 16 also adds stability to the reflector mounted in the housing. In particular, the LDM may be seated on a rib in the back of the reflector and, once assembled with the mounting screws and ball studs, should prevent the reflector from twisting or warping.

Figure 7:
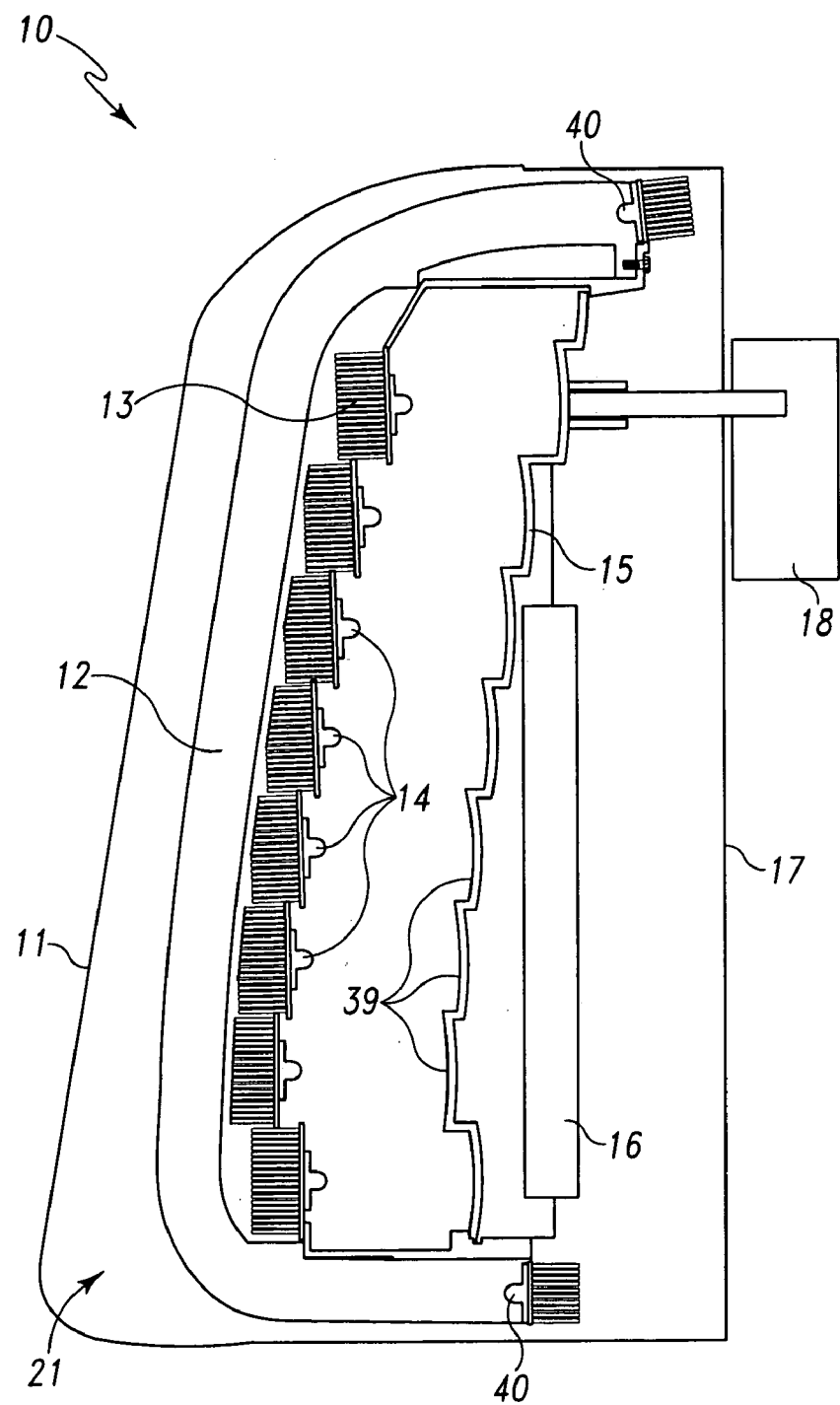
FIG. 7 shows a cross-sectional view of the LED lamp along line VII—VII of FIG. 4.

The reflector 15 is positioned within the lamp cavity 21 between the LED carrier 13 and the LDM 16. The reflector 15 includes several distinct reflective surfaces (also referred to herein as "facets") 39, with each reflective surface 39 having a different focus. The facets 39 of the reflector are arranged vertically on the reflector 15. As shown in FIG. 7, each facet is separated from neighboring facets by a small sidewall that slightly offsets adjoining facets. This creates a slight stair-step effect to the reflector, allowing the lamp to be angled for aesthetic appearances. Each small sidewall between the facets may include knurling to disperse any light that strikes the sidewall. In addition, each facet 39 of the reflector is positioned directly across from one of the LEDs 14 on the LED carrier and corresponds to that LED.

In this manner, each reflector facet is designed to transform light from its associated LED into a desired portion of the total light beam emitted from the lamp 10. The LED seats 37 on the LED carrier 13 are properly positioned such that when a LED is placed in one of the LED seats, it is properly oriented with respect to the corresponding reflector facet. Typically, the LEDs are positioned directly opposed to the reflector facets (i.e., the optical axis of the LED is substantially perpendicular to the centerline of the facet such that the optical axis of the LED passes through the focus of the reflector). The LED carrier 13 is removed a sufficient distance from the reflector to allow each LED to be positioned substantially at the focal point of one of the plurality of facets.

The light pipe 12 extends along the length of the front of the LED carrier 13 and shields the LED carrier and light source from view when the headlamp assembly is viewed from the front. The light pipe 12 includes two side rails 22 that extend vertically along the light pipe and form a vertical channel 23 in the rear of the light pipe for receiving the LED carrier 13. The LED carrier 13 is partially inserted into the channel 23 such that the side rails 22 of the light pipe shield the LED carrier from view. The LED carrier does not contact the light pipe because the heat from the LED carrier could cause damage to the light pipe. Furthermore, the rear of the light pipe, including the vertical channel may be painted or metalized to reflect as much heat as possible and protect the light pipe from damage. Such a reflective coating on the light pipe will also increase the efficiency of the light pipe while helping to obscure the LED carrier from view.

The light pipe 12 itself receives light from a light source such as an LED, which may also be positioned on the LED carrier, such as the LEDs 40 shown in FIG. 5 for positioning on the mounting brackets of the LED carrier. With this arrangement, the LEDs 40 shine light in the opposite direction of the other LEDs 14 on the LED carrier. For example, the LEDs 40 shine light into a light entrance in the light pipe 12. The light pipe channels light from LEDs 40 along its distance, with only the light reflected at an angle that is greater than the critical angle escaping the light pipe. This results in a soft glow from the light pipe. Accordingly, the light pipe not only shields the LED carrier from view, but also adds an interesting visual feature to the lamp 10. Thus, although the LED carrier and light pipe are both positioned in the path of the beam of light created by the reflector, the light from the light pipe provides additional light that is viewed with respect to the lamp, instead of a void in the front of the lamp.

The outer lens 11 encloses the lamp cavity 21. The lens 11 may or may not include a prescription that helps form the desired beam pattern. If the lens does not include a prescription, the desired beam pattern is formed using reflector optics alone.

As shown in FIG. 5, the lamp 10 may also include a leveling motor 18 positioned outside of the housing 17. The leveling motor 18 works with associated drive mechanisms (not shown) and provides a way to aim the reflector up or down, as is common in the art. In particular, the reflector is designed to pivot on ball studs 19 joined to the reflector. Operation of the leveling motor 18 acts to move the top of the reflector in or out, pivoting the reflector about the ball studs. This may also be accomplished using a simple mechanical screw mechanism, as is well-known in the industry. By moving the top of the reflector in or out, the resulting light beam is aimed up or down. This aiming feature is particularly applicable when the lamp 10 is used as a headlamp, but is less likely to apply when the lamp is used as a signal lamp.

In operation of the lamp 10, the LEDs 14 positioned on the LED carrier shine light directly on to the facets the reflector 15. Light from the LEDs is reflected off the reflector 15 and forms a desired light beam pattern for an automotive head lamp or signal lamp. The desired light beam is propagated in a direction substantially opposed to the initial direction of light travel from the LEDs. The light pipe that covers the LED carrier may be used to provide a minimal amount of light for aesthetic purposes or may provide a significant amount of light that significantly contributes to the desired beam pattern. In one embodiment, the light pipe is used to provide a secondary function, such as a parking light. In signal lamp applications, the light pipe may be used to provide secondary functions such as tail lights.

Although the present invention has been described in considerable detail with reference to certain preferred versions thereof, other versions are possible. For example in an alternative embodiment of the invention, the side rails of the light pipe may be eliminated to allow more air to circulate around the heat sink, providing better cooling of the LEDs and additional protection for the light pipe. In another alternative embodiment a bezel may be provided on the lamp to block excess glare light from the LEDs that strays from striking its corresponding facet. In yet another embodiment, the light pipe and LED carrier could be positioned horizontally or diagonally instead of vertically. Additionally, the LED carrier and mounting bracket may comprise a single integral piece or a plurality of attached pieces. Furthermore, the light pipe may be used to contribute to the main beam pattern formed by light that shines off the reflector, or the light pipe may operate independent of the light sources that create the main beam pattern (e.g., the light pipe may be illuminated when the LEDs that shine on to the reflector are off). These are but a few of the many different embodiments of the invention that are possible. Therefore, the spirit and scope of the appended claims should not be limited to the description of the preferred versions contained herein.

What is claimed is:

1. An automotive lamp assembly comprising:
   a. a reflector for reflecting light into a light beam, the direction of propagation of the light beam defining locations in front of the reflector, the reflector comprising a plurality of facets vertically arranged upon the reflector;
   b. a light pipe positioned in front of the reflector so that the light pipe extends vertically from a top to a bottom of the reflector;
   c. a light source carrier positioned behind the light pipe; and
   d. at least one light source positioned on the light source carrier and arranged and disposed to emit light on to the reflector.

2. The automotive lamp assembly of claim 1 wherein the at least one light source comprises a plurality of LEDs.

3. The automotive lamp assembly of claim 2 wherein the light source carrier comprises a plurality of LED seats and each of the plurality of LEDs is arranged on one of the plurality of LED seats such that each of the plurality of LEDs is directly opposed to one of the plurality of facets of the reflector.

4. The automotive lamp assembly of claim 1 wherein the light source carrier is a heat sink.

5. The automotive lamp assembly of claim 1 wherein the light pipe is positioned in the path of the light beam.

6. The automotive tamp assembly of claim 1 wherein the at least one light source is a first at least one light source and the lamp assembly further comprises a second at least one light source positioned to emit light into the light pipe.

7. An automotive lamp assembly designed to create a light beam that propagates in a forward direction with respect to the automotive lamp assembly, the automotive lamp assembly comprising:
   a. a plurality of LEDs arranged and disposed to direct light in a direction substantially opposite the forward direction;
   b. a reflector arranged and disposed to receive light from the plurality of LEDs and reflect the light in the forward direction, thereby forming the light beam;
   c. an LED carrier positioned in front of the reflector such that each of the plurality of LEDs is positioned upon the LED carrier;
   d. a light pipe positioned in front of the LED carrier with at least one light source positioned to emit light into the light pipe.

8. The automotive lamp assembly of claim 7 wherein the reflector comprises a plurality of facets positioned vertically upon the reflector.

9. The automotive lamp assembly of claim 7 wherein the light pipe and LED carrier both extend vertically from a top to a bottom of the reflector.

10. An automotive lamp assembly comprising:
    a. a reflector having a plurality of facets vertically arranged upon the reflector for reflecting light into a light beam, the direction of propagation of the light beam defining locations in front of the reflector;
    b. a light pipe positioned in front of the reflector;
    c. a light source carrier having a front side and a back side, the light source carrier positioned behind the light pipe;
    d. a first at least one light source positioned on the light source carrier and arranged and disposed to emit light on to the reflector; and
    e. a second at least one light source positioned to emit light into the light pipe.

11. The automotive lamp assembly of claim 10, wherein each of the plurality of facets has a distinct focal point.

12. The automotive lamp assembly of claim 11, wherein the first at least one light source comprises a plurality of LEDs, each of the plurality of LEDs (i) corresponding to one of the plurality of facets, (ii) located on the light source carrier so that each of the LEDs is positioned substantially close to the focal point of one of the plurality of facets, and (iii) arranged to emit light on to one of the plurality of facets.

13. The automotive lamp assembly of claim 12 wherein each of the plurality of LEDs is directly opposed to one of the plurality of facets of the reflector.

14. The automotive lamp assembly of claim 12 wherein the light source carrier serves as a heat sink for the plurality of LEDs.

15. The automotive lamp assembly of claim 12 wherein the light pipe is adjacent to the front side of the light source carrier such that the light pipe at least partially covers the front side of the light source carrier.

* * * * *